United States Patent [19]

Moss

[11] 4,029,501

[45] June 14, 1977

[54] METHOD OF PREPARING IMPROVED MAGNETIC HEAD MATERIAL

[75] Inventor: Herbert Irwin Moss, Yardley, Pa.

[73] Assignee: RCA Corporation, New York, N.Y.

[22] Filed: Jan. 26, 1976

[21] Appl. No.: 652,225

[52] U.S. Cl. .................................. 75/206; 75/212; 75/226; 360/110
[51] Int. Cl.² ........................................... B22F 3/14
[58] Field of Search .................... 75/206, 226, 212; 179/100.2 C

[56] References Cited

UNITED STATES PATENTS

| | | | |
|---|---|---|---|
| 2,864,734 | 12/1958 | Adams et al. | 75/206 |
| 3,320,057 | 5/1967 | Malmateer | 75/206 |
| 3,661,570 | 5/1972 | Moss | 75/206 |
| 3,676,610 | 7/1972 | Moss et al. | 179/100.2 |
| 3,739,445 | 6/1973 | Gabriel | 75/206 X |

*Primary Examiner*—Richard E. Schafer
*Attorney, Agent, or Firm*—Glenn H. Bruestle; Birgit E. Morris

[57] ABSTRACT

A method of forming hardened magnetic transducer material for use in record playback heads whereby a thin encapsulating firm of oxide is formed in aqueous basic sodium chlorate solution about finely divided particles of a magnetic alloy of iron, silicon and aluminum. The encapsulated particles are then hot pressed to form improved magnetic transducer material.

8 Claims, No Drawings

METHOD OF PREPARING IMPROVED MAGNETIC HEAD MATERIAL

This invention relates to an improved method of making magnetic record-playback heads. More particularly, this invention relates to an improved method of making magnetic alloys of iron, silicon and aluminum containing oxides which improve their performance in record-playback heads.

BACKGROUND OF THE INVENTION

U.S. Pat. Nos. 3,661,570 to Moss and 3,676,610 to Moss et al, incorporated herein by reference, describe methods of making alloys of iron, silicon and aluminum containing a dispersed second phase of an oxide for use in magnetic record-playback heads having improved wear properties. According to the process described in U.S. Pat. No. 3,661,570, small particles of a magnetic iron-silicon-aluminum alloy were milled in alcohol solution containing about 20 volume percent of water to reduce the particle size to less than 44 microns, preferably less than 20 microns, while oxidizing the particles so that they have a thin layer about 2 microns thick of oxide on the outside of the particles. The particles were then densified, as by hot pressing at about 1000° C. and about 15,000 psi pressure, for an hour. The presence of the oxide serves to increase the hardness of the alloy to form about 48 to about 50 hardness on the Rockewell "C" scale, with resultant decrease in wear of record-playback heads made therefrom.

In an alternate method of preparing these oxidized alloys, U.S. Pat. Nos. 3,739,445 and 3,814,598 to Gabriel et al. describe a thermal process whereby finely divided iron-silicon-aluminum alloy powders having a particle size of about 10–20 microns prepared by atomizing the molten alloy, separating and milling oversize particles in dry alcohol and combining them with unmilled particles, are oxidized by heating at about 600° F. for an hour in air. The oxidized particles contain from about 3400–4400 parts per million of oxygen. These oxide powders are then hot pressed in a manner similar to that taught in the above-described Moss patents to form alloys also having a Rockwell C hardness of about 50.

Summary of the Invention

I have discovered an improved method of oxidizing magnetic iron-silicon-aluminum alloys which can be hot pressed to form a magnetic record-playback head material having improved Rockwell C hardness greater than 50. This method comprises oxidizing finely-divided iron-silicon-aluminum alloy particles in an aqueous basic alkali metal chlorate solution prior to densification.

DETAILED DESCRIPTION

According to the present process, finely-divided particles of magnetic iron-silicon-aluminum alloys are stirred in a hot basic aqueous solution of an alkali metal, e.g., sodium, chlorate until the desired oxidation has taken place, after which the solution is rapidly cooled, the oxidized magnetic powder particles are separated and dried and then densified in a conventional manner.

The magnetic alloys suitable for use in the invention can contain about 6–12% by weight of silicon, about 4–9% by weight of aluminum, the combined maximum weight percent of silicon and aluminum being about 17% and the balance substantially iron. Particularly suitable for use in the invention is an iron alloy known as Alfecon or Sendust which contains about 9.4% by weight of silicon and about 5.7% by weight of aluminum.

The above alloys are available commercially. They are reduced to a particle size of less than 44 microns and, preferably, less than about 20 microns, according to methods known to one skilled in the art.

In carrying out the present process, a basic aqueous solution is prepared from any strong inorganic base, such as sodium hydroxide, potassium hydroxide, or the like, and the solution is heated to an elevated temperature, suitably from about 45° C. up to the boiling point of the solution. A small amount of alkali metal chlorate is then added. The finely-divided alloy particles are then rapidly stirred into the solution to form a thin oxide layer around each particle. The oxide layer should be about 1–2 microns thick for a particle size of the alloy of about 10–20 microns. If the oxide layer is too thin, very little second phase material will be present in the grain boundaries of the final material and the benefits of the invention will not be realized. Of course if the oxide layer is too thick, the magnetic properties of the final material will be adversely affected. The amount of oxide formed will depend on the temperature of the basic solution, the amount of alkali metal chlorate present and the time of oxidation. The optimum parameters required for the desired oxide formation can be determined by a series of test runs by one skilled in the art. The final product should contain from about 2000 up to about 7500 parts per million of oxygen, preferably from about 3000–6000 parts per million of oxygen.

The oxidized particles are then rapidly cooled to stop the oxidation reaction, separated from the solution, washed thoroughly to remove the base and chlorate and dried.

The dried particles are then hot pressed in conventional manner. The oxidized particles are densified to the desired shape by means of vacuum hot pressing or hot pressing in an inert gas such as argon. The hot pressing takes place at a temperature of about 950–1100° C. while maintaining the pressure at about 15,000 psi for a period of about 1 hour. At the end of the densification step, the pressure is released and the die is allowed to cool to room temperature. The resultant final product should exhibit a density greater than about 99.9% of the theoretical density. This is required because almost a void or pore free material is essential for video magnetic playback/record heads to maintain good gap definition during operation and high frequency response. For video applications, a porosity no greater than 1% and preferably no greater than 0.1% should be provided in the final material.

The present method, which oxidizes the ironsilicon-aluminum alloys rapidly at low temperatures, has the advantages of simplicity of the processing steps and equipment, rapid oxidation time and lower energy requirements. The present method provides a uniform oxide coating around each magnetic powder particle in a short time and produces a densified final product having improved hardness as measured on the Rockwell C scale, but without adversely affecting the magnetic properties of the final product, including saturation magnetization, remanent magnetization, permeability or coercivity.

The invention will be further illustrated by the following Examples but it is to be understood that the invention is not meant to be limited to the details described therein.

EXAMPLE 1

A vessel was charged with 900 parts of distilled water and 0.22 mol of sodium hydroxide and heated to about 85° C. While stirring, 0.084 mol of sodium chlorate was added and the temperature stabilized at 85° C. 220 parts of a magnetic alloy of 84.9% iron, 9.4% silicon and 5.7% aluminum having a particle size less than 20 microns was added quickly and stirred rapidly for 2 minutes when 1000 parts of cold water was added to halt the oxidation. The solution was decanted off, the oxidized powder washed several times with water, then twice with isopropanol and dried under vacuum at about 70° C.

The oxidized particles were then densified by heating in a suitable die in a vacuum hot press up to 1040°–1060° C. while increasing the pressure to about 15,000 psi and maintaining these conditions for one hour. The pressure was released and the densified product cooled to room temperature for fabrication into magnetic record-playback heads. The resultant product had a density equal to or greater than 99.9% theoretical density and a Rockwell C hardness of 53.

A section of the pressed alloy was polished, etched and examined under a microscope. The material had little or no porosity and had a second phase distributed in the grain boundaries along with no grain growth.

EXAMPLE 2

The procedure of Example 1 is followed except substituting the corresponding potassium compounds for the sodium compounds.

Similar results are obtained.

I claim:

1. A method of oxidizing magnetic transducer head material having a first phase of a magnetic alloy or iron, silicon and aluminum and a hard, abrasion-resistant second phase at the grain boundaries of said first phase comprising
    forming a thin oxide layer encapsulating finely-divided particles of an alloy of iron, silicon and aluminum in a hot aqueous base solution containing an oxidizing amount of alkali metal chlorate,
    collecting the oxidized particles, and
    hot pressing the particles to form a substantially theoretically dense, compacted body from said oxidized particles, said body containing from about 2000 up to about 7500 parts per million of oxygen.

2. A method according to claim 1 wherein said alkali metal chlorate is sodium chlorate.

3. A method according to claim 1 wherein the alloy consists essentially of about 2–12% by weight of silicon, about 2–10% by weight of aluminum and the balance iron.

4. A method according to claim 3 wherein said alloy contains about 9.4% by weight of silicon and about 5.7% by weight of aluminum.

5. A method according to claim 1 wherein the oxidation forms a material which after hot pressing contains about 2000 to about 7500 parts per million of oxygen.

6. A method according to claim 1 wherein said iron-silicon-aluminum alloy particles have a particle size up to about 20 microns and said oxide layer is from about 1–2 microns thick.

7. A method according to claim 1 wherein said compacted body contains from about 3000 to about 6000 parts per million of oxygen.

8. A compacted body prepared according to the method of claim 1.

* * * * *

UNITED STATES PATENT OFFICE
CERTIFICATE OF CORRECTION

PATENT NO. : 4,029,501
DATED : June 14, 1977
INVENTOR(S) : Herbert Irwin Moss

It is certified that error appears in the above-identified patent and that said Letters Patent are hereby corrected as shown below:

In the Abstract

Line 3, "firm" should be --film--.

In the Specification

Column 1, line 29, "form" should be --from--.

Column 1, line 29, "Rockewell" should be --Rockwell--

Column 2, line 57, "ironsilicon" should be --iron-silicon--.

In the Claims

Claim 1, line 2, "or" should be --of--.

Claim 5, was cancelled.

Claim 8, was cancelled.

On the title page "8 Claims" should read -- 6 Claims --.

Signed and Sealed this

First Day of November 1977

[SEAL]

Attest:

RUTH C. MASON
Attesting Officer

LUTRELLE F. PARKER
Acting Commissioner of Patents and Trademarks